UNITED STATES PATENT OFFICE.

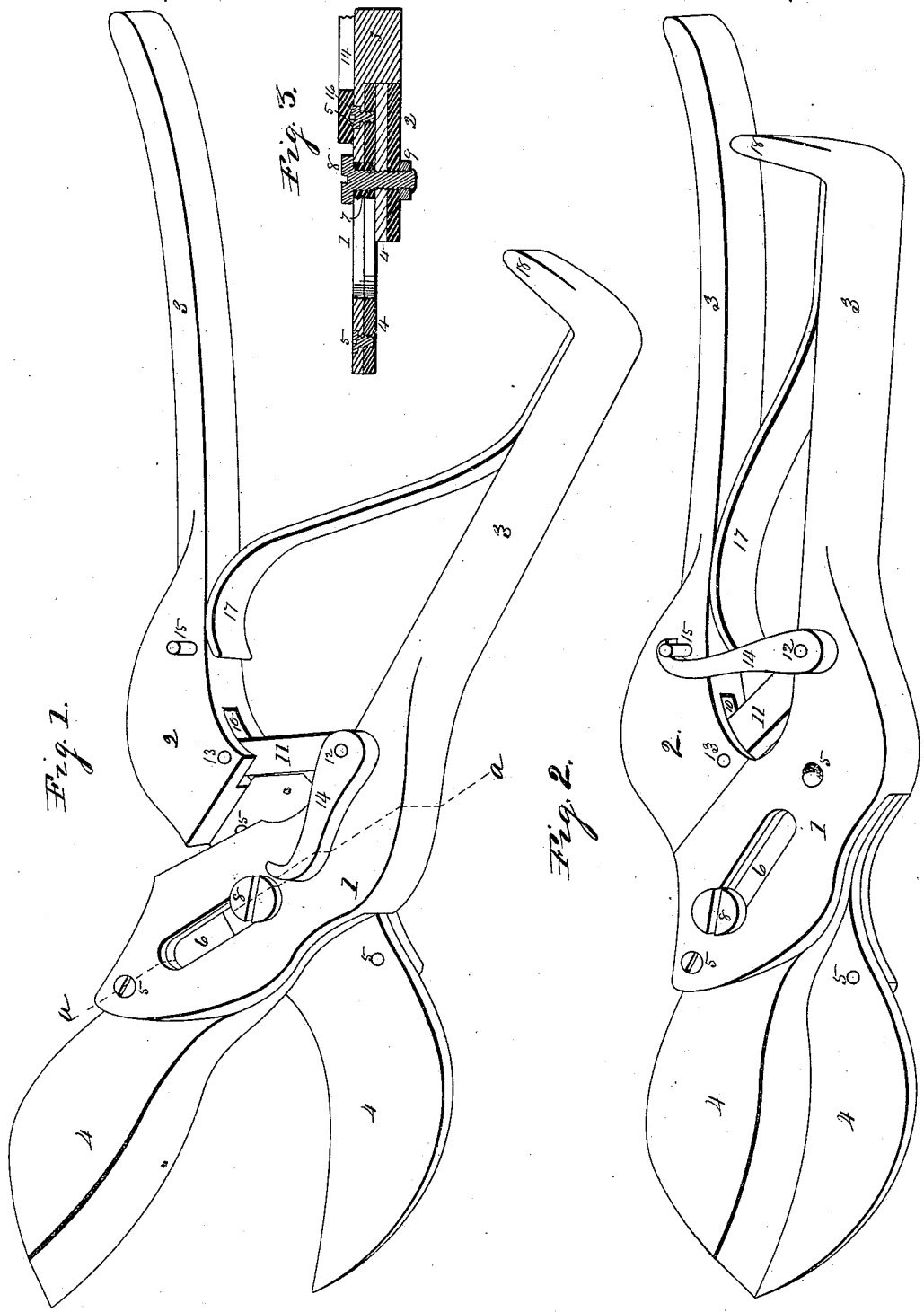

JOHN L. DUFRANE, OF ROCKFORD, ILLINOIS.

PRUNING-SHEARS.

SPECIFICATION forming part of Letters Patent No. 356,278, dated January 18, 1887.

Application filed September 29, 1886. Serial No. 214,882. (No model.)

*To all whom it may concern:*

Be it known that I, JOHN L. DUFRANE, a citizen of the United States, residing in the city of Rockford, in the county of Winnebago and State of Illinois, have invented new and useful Improvements in Shears, of which the following is a specification.

This invention relates more especially to pruning-shears, but is applicable to other varieties. Its object is to produce a drawing or slip cut; and it consists in a construction of shear blades and handles, and in their connection with each other, by which in the closing and opening movements the shear-blades will move endwise relatively with each other.

In the accompanying drawings, Figure 1 is an isometrical representation of shears in their open position embodying my invention. Fig. 2 is also an isometrical representation of my improved shears in their closed position; and Fig. 3 is a transverse section on dotted line *a*, Fig. 1.

The shears represented in the figures are of a variety known as "pruning-shears." The shear-blades 1 and 2 are composed of a handle portion, 3, and a cutter, 4. The handle portions are recessed on the meeting face of their forward ends, and the cutters are fixed to their respective handle portions by bolts, screws, or rivets 5, passed through the parts.

An oblique slot, 6, is formed in the shear-blade 1, and an anti-friction roller, 7, is placed in the oblique slot, and a pivot-screw, 8, is passed through the anti-friction roller, and is screw-threaded in its connection with the non-slotted shear-blade 2, to hold them to each other in working contact.

In connection with the pivot-screw in its screw-threaded connection with the non-slotted shear-blade, a lock-nut, 9, is placed on its projecting end and serves as a lock or jam nut to the pivot-screw to hold it in place.

A mortise, 10, is formed in the inner edge of the shear-blades rearward of their pivotal connection. These mortises 10 receive the ends of a bar-link, 11, and pivot-bolts 12 and 13, passed through the parts, form a free pivotal connection of the bar-link with the shear-blades.

A hook-clasp, 14, is pivotally supported on the pivot 12 of the bar-link, and its hook end engages a stud-pin, 15, rising from the shear-blade 2, to hold the shear-blades closed.

The free end of the hook-clasp 14 is indented or formed with a countersink, 16, on its under face, to receive the crowning-head of one of the bolts, screws, or rivets 5, or a prominence on the blade to hold it in its open position, as shown in Fig. 1, when the shears is open.

A spring, 17, is fixed to the free handle end of the shear-blade 1, and its free end engages the inner face of the shear-blade 2, near its pivotal connection with the bar-lever, and its spring action tends to hold the shears open.

In closing the shear-blades the bar-link, in connection with the oblique slot, produces a toggle-lever action, to cause the shear-blades to move endwise relative with each other in opposite directions, producing a drawing or slip cut.

In trimming young trees and shrubs it is quite essential that the branches should be cut quite closely to the body, in order that the cut surface may heal over, instead of decaying, as it is liable to do when the branch is cut at a short distance from the body. As commonly constructed, pruning-shears are provided with one sharp cutting-jaw and one having a very blunt or squared edge, against which the branch is forced by the cutting-jaw, and which serves rather as a support for the branch than a cutter. In my present invention the blades 4 are both sharp and quite thin, and both do their share of the cutting, as they are forced in opposite directions by the motion of the vibrating link 11 in conjunction with the pivotal sliding bolt connecting the blades. The operator is thus enabled to trim the branches close to the body on both sides of the tree without changing his position. The location of the vibrating link 11 in a central mortise formed in one of the jaws serves to bring the plane of its vibrations into the plane of the resistance of the cutting-jaws, whereby they cut with equal efficiency whether used on the right or left hand side.

The rear end of the shear-blade 1 is formed with the usual upturned end, 18, to limit the closing movement of the blades.

In this instance I have represented and described the shear-blades as produced in two parts and joined by bolts, screws, or rivets;

but they may be produced in a single piece, substantially as shear-blades have heretofore been produced.

I claim as my invention—

1. In pruning-shears, the combination, with a pair of cutting-blades pivotally secured together in sliding adjustment relatively to each other, of the vibrating link pivotally secured to the handles of the blades in the plane of the cutting-edges, and having its end housed between the walls of a mortise formed in the handle, substantially as set forth.

2. The combination, with the shear-blades, of a hook-clasp to connect the blades, said clasp indented on its under face to engage a prominence on the shear-blade to which it is pivotally connected, substantially as and for the purpose set forth.

JOHN L. DUFRANE.

Witnesses:
C. H. C. BURLINGAME,
A. O. BEHEL.